United States Patent
Nasu et al.

(10) Patent No.: US 9,277,051 B2
(45) Date of Patent: Mar. 1, 2016

(54) SERVICE SERVER APPARATUS, SERVICE PROVIDING METHOD, AND SERVICE PROVIDING PROGRAM

(75) Inventors: Kazunori Nasu, Chiyoda-ku (JP); Seiji Shibata, Chiyoda-ku (JP); Mari Akuzawa, Chiyoda-ku (JP); Ken Uchiyama, Chiyoda-ku (JP)

(73) Assignee: NTT DOCOMO, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/816,457

(22) PCT Filed: May 24, 2012

(86) PCT No.: PCT/JP2012/003392
§ 371 (c)(1),
(2), (4) Date: Feb. 11, 2013

(87) PCT Pub. No.: WO2012/160823
PCT Pub. Date: Nov. 29, 2012

(65) Prior Publication Data
US 2014/0066022 A1 Mar. 6, 2014

(30) Foreign Application Priority Data

May 24, 2011 (JP) .................................. 2011-116400
May 23, 2012 (JP) .................................. 2012-117544

(51) Int. Cl.
*H04M 11/10* (2006.01)
*H04M 3/42* (2006.01)
(Continued)

(52) U.S. Cl.
CPC ......... *H04M 3/42221* (2013.01); *G06F 17/289* (2013.01); *H04M 3/42* (2013.01);
(Continued)

(58) Field of Classification Search
None
See application file for complete search history.

(56) References Cited

U.S. PATENT DOCUMENTS

2004/0092293 A1 5/2004 Lee et al.
2009/0177461 A1 7/2009 Ehsani et al.
(Continued)

FOREIGN PATENT DOCUMENTS

JP 64-088875 A 4/1989
JP 05-167688 A 7/1993
(Continued)

OTHER PUBLICATIONS

PCT/JP2012/003392 PCT/IB/310, dated May 3, 2013, 1 page.
(Continued)

*Primary Examiner* — Charles Appiah
*Assistant Examiner* — Randy Peaches
(74) *Attorney, Agent, or Firm* — Crowell & Moring LLP

(57) ABSTRACT

A service server apparatus is provided which can easily cope with a correction of an error of a task performed based on the content of verbal speeches of a speaker. The service server apparatus includes a service activating unit that receives an instruction for performing a different task from a task performed by an application relating to a speech communication, a telephone/call control enabler that records verbal speeches of the speaker during a speech communication between a plurality of speech communication terminal device, a speech recognizing enabler which performs a task based on the recorded speeches and which generates task data including text data representing the result of the performance and speech data representing the result of the performance, a text translating enabler, and a speech synthesizing enabler.

7 Claims, 8 Drawing Sheets

(51) Int. Cl.
*G06F 17/28* (2006.01)
*G10L 15/26* (2006.01)
*G10L 13/00* (2006.01)

(52) U.S. Cl.
CPC ............... *G10L 13/00* (2013.01); *G10L 15/26* (2013.01); *H04M 2201/26* (2013.01); *H04M 2201/39* (2013.01); *H04M 2201/40* (2013.01); *H04M 2201/60* (2013.01); *H04M 2203/2061* (2013.01)

(56) References Cited

U.S. PATENT DOCUMENTS

| | | | |
|---|---|---|---|
| 2009/0281789 A1* | 11/2009 | Waibel et al. | 704/3 |
| 2010/0121629 A1 | 5/2010 | Cohen | |
| 2010/0185434 A1* | 7/2010 | Burvall et al. | 704/3 |
| 2010/0324894 A1 | 12/2010 | Potkonjak | |
| 2012/0330643 A1* | 12/2012 | Frei et al. | 704/2 |

FOREIGN PATENT DOCUMENTS

| | | |
|---|---|---|
| JP | 05-260193 A | 10/1993 |
| JP | 2002-152387 A | 5/2002 |
| JP | 2003-259034 A | 9/2003 |
| JP | 2004-159335 A | 6/2004 |
| JP | 3741025 B2 | 2/2006 |
| JP | 2006-109110 A | 4/2006 |
| JP | 2007-058829 A | 3/2007 |
| JP | 2008-109263 A | 5/2008 |
| JP | 3142002 U | 5/2008 |
| JP | 2009-157583 A | 7/2009 |
| JP | 2010-050693 A | 3/2010 |
| JP | 2011-066917 A | 3/2011 |
| WO | WO 2008/066836 A1 | 6/2008 |

OTHER PUBLICATIONS

PCT/JP2012/003392 PCT/ISA/237 (English translation), dated Aug. 7, 2012, 4 pages.
European Search Report dated Dec. 6, 2013 (Seven (7) sheets).
Chinese Office Action dated Jul. 18, 2014, with English translation (Twenty Two (22) pages).
U.S. Appl. No. 13/816,705, filed Feb. 12, 2013, Kazunori Nasu et al.
Kanbara Kenichi, "iTranslator for Android, highly functionable translation application corresponding to 20 languages", http://andronavi.com/2010/09/40880, Sep. 1, 2010, 8 pages.
"World-phone", iplatform.org, 31 pages.
Japanese Office Action (w/English translation), dated Jul. 24, 2012, 5 pages total.
Japanese Office Action dated Aug. 20, 2013, with English Translation (Five (5) pages.
Chinese Office Action dated Sep. 29, 2014, with English translation (Sixteen (16) pages).

* cited by examiner

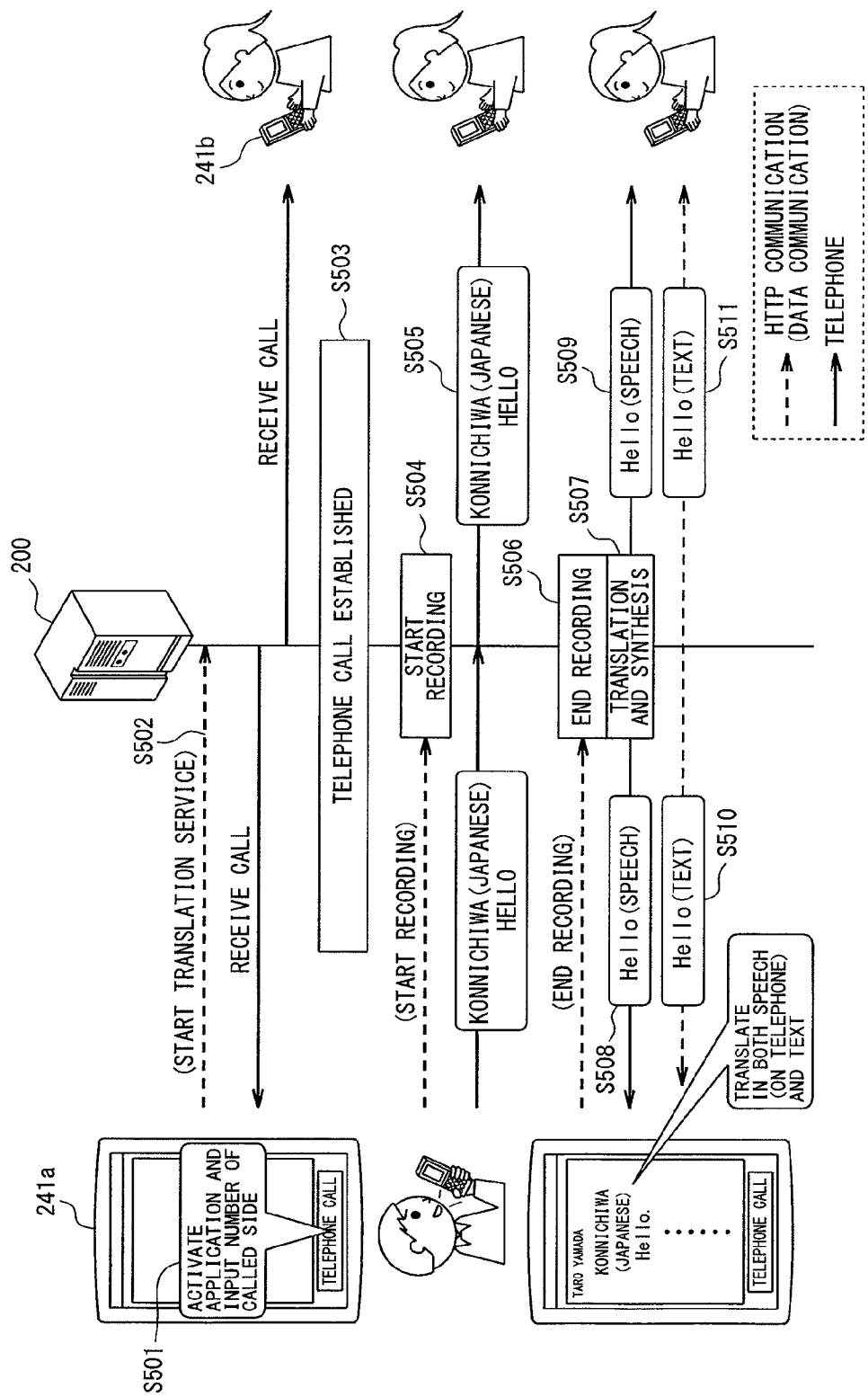

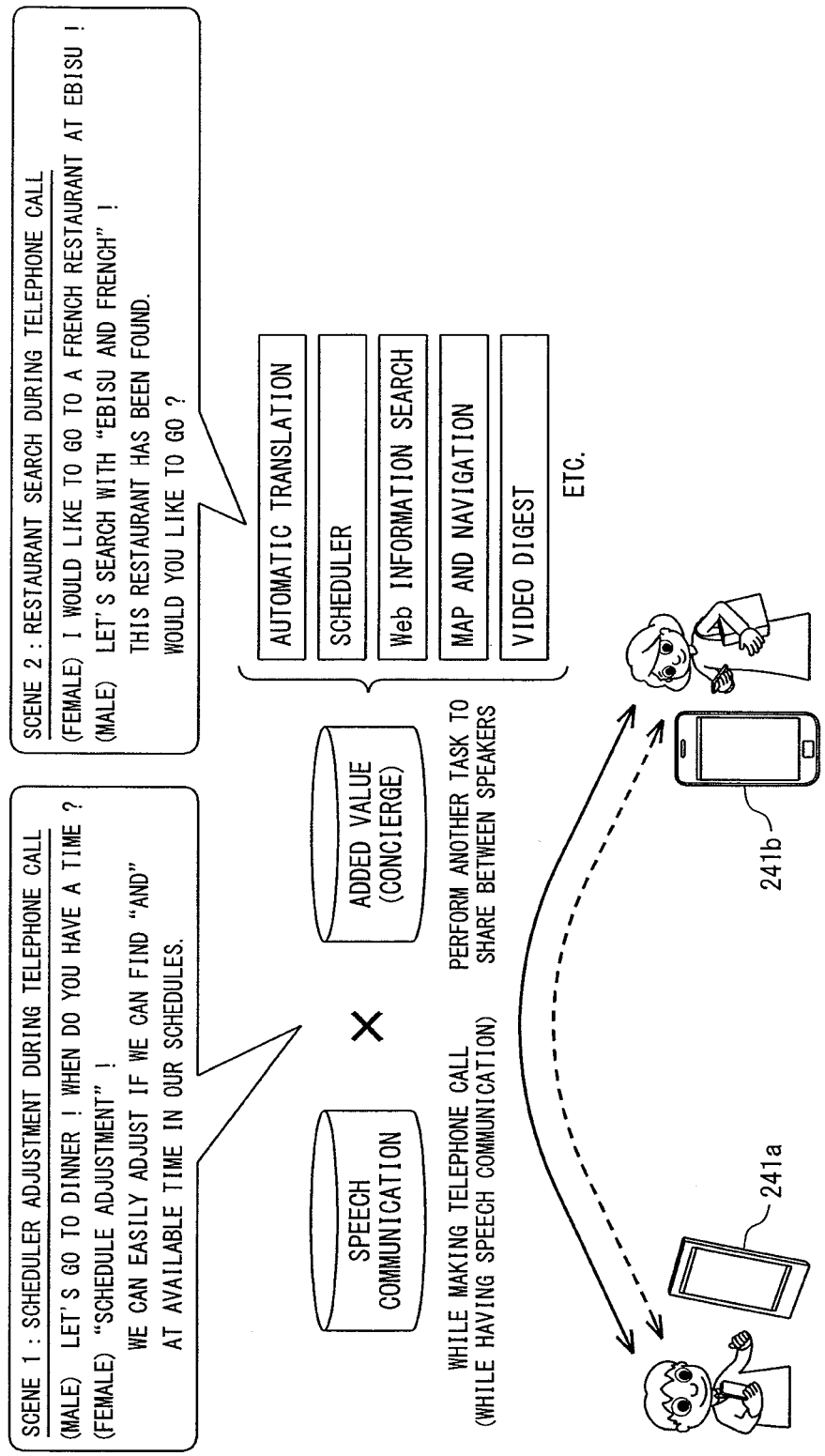

SERVICE SERVER APPARATUS, SERVICE PROVIDING METHOD, AND SERVICE PROVIDING PROGRAM

TECHNICAL FIELD

The present invention relates to a service server apparatus, a service providing method, and a service providing program for providing a service through a communication, and in particular, to a service server apparatus, a service providing method, and a service providing program for providing a service other than a telephone call, during the telephone call on a telephone.

BACKGROUND ART

These days, translators and translation systems are in practical use for automatically translating the content of a talk made by a speaker in an arbitrary language into another language. Conventional translators, etc., include a so-called personal type or interactive type, and a so-called remote conversation type.

FIG. 8A is a diagram illustrating a personal type translator. In the case of FIG. 8A, for example, a speaker inputs verbal speeches "kono hon wa ikura desuka? (Japanese) how much is this book?" in Japanese into the translator. In this case, the translating function of the translator translates the Japanese verbal speeches into English and outputs synthesized speeches "how much is this book?". The personal translator can be used as a Japanese-English dictionary or can be used for a speaker to tell the intent of the speaker himself/herself to another person by letting another person in seeing the speaker face to face to listen the synthesized speeches. For example, Non-patent Document 1 discloses such a conventional translator.

FIG. 8B is a diagram illustrating a remote conversation type translator. The translator illustrated in FIG. 8B has a speech communication function as a telephone and a translating function. In the case of FIG. 8B, for example, a speaker who is Japanese inputs verbal speeches "please make a reservation for three people" in native Japanese into the translator. In this case, the translating function of this translator translates the Japanese verbal speeches into English, and outputs synthesized speeches "Please make a reservation for three people". The remote conversation type translator allows a speaker to tell the intent of the speaker himself/herself to another person who does not understand the native language of the speaker while the speaker is speaking in the native language. For example, Non-patent Document 2 discloses such a conventional translator.

Furthermore, Patent Document 1 discloses another remote conversation type translator. A telephone system disclosed in Patent Document 1 is capable of not only translating the content of a telephone call and transmitting the translated telephone call to a called party, but also transmitting the verbal speeches of a speaker in the telephone call to the called party. Hence, the technology disclosed in Patent Document 1 allows a user to feel as if the user were talking to a called side through an interpreter.

PRIOR ART DOCUMENTS

Patent Document

Patent Document 1: JP 3741025 B

Non-patent Document

Non-patent Document 1: andro navi, [online], "iTranslator for Android, highly functionable translation application corresponding to 20 languages", [searched on May 13, 2011], Internet <URL: http://andronavi.com/2010/09/40880>

Non-patent Document 2: iplatform.org, [online], worldphone [searched on May 13, 2011], Internet <URL: http://www.iplatform.org/>

SUMMARY OF THE INVENTION

Problem to be Solved

According to the technology disclosed in Non-patent Document 2, however, the speeches that are the translation of the content of the verbal speeches of a speaker is transmitted only to a called party. Thus, the speaker is unable to know how the content of the talk of the speaker himself/herself is recognized and translated. Besides, according to the technology disclosed in Patent Document 1, as the speeches that are the translation of the content of the talk of a speaker and the verbal speeches of the speaker in the telephone call are transmitted only to a called party, the speaker is unable to know how the content of the talk made by the speaker himself/herself is translated through the system. Furthermore, according to the technology disclosed in Non-patent Document 1, a speaker is able to check the content input by verbal speeches of the speaker himself/herself and converted into texts. However, the translator is originally designed for personal use, and thus the speaker is unable to transmit the content of the speech while checking the content of the verbal speeches input by the speaker himself/herself through speeches.

For these reasons, when the content of the telephone call made by a speaker is translated through any of the technologies disclosed in Patent Document 1, Non-patent Document 1, and Non-patent Document 2, it is difficult for the speaker to recognize how the content of the talk made by the speaker himself/herself is translated and to correct an error.

The present invention has been made in view of the above-explained circumstances, and it is an object of the present invention to provide a service server apparatus, a service providing method, and a service providing program for providing a service which can easily cope with a correction of an error in a translation made based on the content of a telephone call by a speaker.

Solution to the Problem

To accomplish the above object, there is provided a service server apparatus (e.g., a service server apparatus 200 illustrated in FIG. 2) according to an aspect of the present invention coupled with a plurality of speech communication terminal devices performing speech communication with each other by verbal speeches and providing a service through a different task that is a work performed by a different application from a task performed by an application relating to the speech communication performed between the speech communication terminal devices, the service server apparatus including: an instruction receiving unit (e.g., a service activating unit 250 illustrated in FIG. 2) configured to receive an instruction for performing the different task; a recording unit (e.g., a telephone/call control enabler 201 illustrated in FIG. 2) configured to record a verbal speech of a speaker during the speech communication between the plurality of speech communication terminal devices; the instruction receiving unit (e.g., the service activating unit 250 illustrated in FIG. 2) configured to receive an instruction for performing the different task; a task performing unit (e.g., a speech recognizing enabler 203, a text translating enabler 204, and a speech synthesizing enabler 202 illustrated in FIG. 2) configured to perform the different task based on the verbal speech recorded by the recording unit when the instruction receiving unit receives the instruction; a task data generating unit (e.g., the speech recognizing enabler 203, the text translating enabler 204, and the speech synthesizing enabler 202 illustrated in FIG. 2) configured to generate task data including text data obtained by performing the different task by the task performing unit, and speech data obtained by performing the different task by the task performing unit; and a providing unit (e.g., a communication control unit 224 illustrated in FIG. 2) for providing the task data to each of the plurality of speech communication terminal devices performing the speech communication.

According to the service server apparatus of an aspect of the present invention, in the above-explained configuration, the providing unit may provide the task data and the verbal speech of the speaker to the speech communication terminal device.

According to the service server apparatus of an aspect of the present invention, in the above-explained configuration, the instruction receiving unit may obtain subscriber information registered beforehand relating to the service, and receiving the instruction when the subscriber information includes information specifying the speech communication terminal device.

According to the service server apparatus of an aspect of the present invention, in the above-explained configuration, the speech communication terminal device is a telephone, and the instruction receiving unit may receive the instruction when at least one of the plurality of speech communication terminal devices makes a telephone call using a telephone number to which predetermined information is added.

According to the service server apparatus of an aspect of the present invention, in the above-explained configuration, the task performing unit may start performing the different task when the verbal speech recorded by the recording unit is a verbal speech indicating a predetermined meaning.

According to the service server apparatus of an aspect of the present invention, in the above-explained configuration, the task performing unit is may start performing the different task when a signal output by operating the speech communication terminal device is a predetermined signal.

According to the service server apparatus of an aspect of the present invention, in the above-explained configuration, the task data providing unit may transmit the text data in the task data to a text communication terminal device associated with the speech communication terminal device and may communicate in a text, instead of the speech communication terminal device.

According to the service server apparatus of an aspect of the present invention, in the above-explained configuration, the instruction receiving unit may obtain subscriber information registered beforehand relating to the service, and receive the instruction when the subscriber information includes information specifying the text communication terminal device associated with the speech communication terminal device.

There is provided a service providing method according to an aspect of the present invention performed by a service server apparatus for providing a service, the service server apparatus is connected with a plurality of speech communication terminal devices performing speech communication with each other by verbal speeches and providing a service through a different task that is a work performed by a different application from a task performed by an application relating to the speech communication performed between the speech communication terminal devices, the service providing method includes: an instruction receiving step for receiving an instruction for performing the different task during the speech communication; a recording step for recording a verbal speech of a speaker during the speech communication between the plurality of speech communication terminal devices; a task performing step for performing the different task based on the verbal speech recorded through the recording step when the instruction is received through the instruction receiving step; a task data generating step for generating task data including text data obtained by performing the different task by the task performing unit, and speech data obtained by performing the different task by the task performing unit; and a providing step for providing the task data to each of the plurality of speech communication terminal devices performing the speech communication.

There is provided a service providing program according to an aspect of the present invention is performed by a service server apparatus connected with a plurality of speech communication terminal devices performing speech communication with each other by verbal speeches and providing a service through a different task that is a work performed by a different application from a task performed by an application relating to the speech communication performed between the speech communication terminal devices, the service providing program causes a computer to realize: an instruction receiving function of receiving an instruction for performing the different task during the speech communication; a recording function of recording a verbal speech of a speaker during the speech communication between the plurality of speech communication terminal devices; a task performing function of performing the different task based on the verbal speech recorded by the recording function when the instruction receiving function receives the instruction; a task data generating function of generating task data including text data obtained by performing the different task by the task performing function, and speech data obtained by performing the different task by the task performing function; and a providing function of providing the task data to each of the plurality of speech communication terminal devices performing the speech communication.

Advantageous Effects of the Invention

According to the above-explained aspects of the present invention, task data including a text and a speech is generated through a performance of a task, and is transmitted to each of speech communication terminal devices during a telephone call. This allows a speaker to receive the performance result of the task also through the text together with translated speeches. Hence, it becomes easy to cope with an error and a correction of the task that has been performed based on the content of the telephone call made by the speaker.

According to the above-explained aspects of the present invention, task data and verbal speeches of a speaker can be transmitted to a called side. Hence, when the task data includes translated speeches, the translated speeches of the speaker can be transmitted to the called side together with the performance result of a task. Moreover, according to the above-explained aspects of the present invention, a task is performed through an application different from an application relating to a speech communication, and thus telephone call speeches by the speaker can be transmitted to the called side together with the performance result of a task using the existing application relating to speeches and the application for performing the task. According to Such aspects of the present invention, it is made possible to provide a telephone call service which gives users a realistic feel as if they were having a face-to-face conversation using the existing application even though they are remotely located.

BRIEF DESCRIPTION OF THE DRAWINGS

FIG. 6 is a diagram for explaining a service providing method according to the embodiment of the present invention;

FIG. 7 is a diagram for explaining an example case where the present invention is applied to an application for adjusting the schedule of a user.

DESCRIPTION OF EMBODIMENTS

Figure 1:
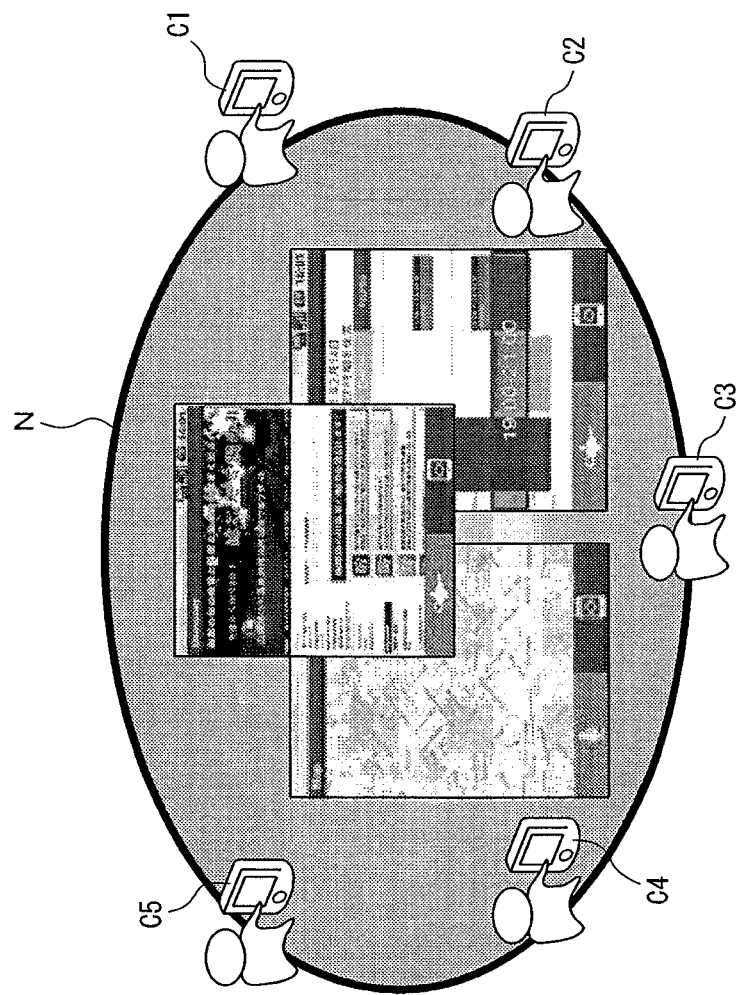
FIG. 1 is a diagram for explaining the outline of a service as a precondition to an embodiment of the present invention.

Embodiments of a service server apparatus, a service providing method, and a service providing program according to the present invention will now be explained with reference to the accompanying drawings. The same structure in each drawing as that of other drawings will be denoted by the same reference numeral, and some of the explanation thereof will be omitted in some cases.

(Communication Concierge)

FIG. 1 is a diagram for explaining the summary of a service as a precondition to the present embodiment. This service is developed so as to support a conversation (hereinafter, referred to as a telephone call) through a communication terminal device having a telephone call function as if a user were seeing a called person and having a face to face conversation. The service as a precondition to the present embodiment is also referred to as a CC (Communication Concierge) service, hereinafter.

As illustrated in FIG. 1, the CC service is a service provided to communication terminal devices c1 to c5 being connected to a network N. Any one of a telephone having a telephone call function, a communication terminal device (e.g., a smart phone) connected to the network N and capable of transmitting/receiving texts through packet communication, or a communication terminal device capable of transmitting/receiving both telephone call speech and texts can be used as the communication terminal devices c1 to c5. Moreover, the communication terminal devices c1 to c5 may have functions of transmitting/receiving not only texts but also still images, motion images, and music.

According to the present embodiment, it is assumed that a user of at least one of the communication terminal devices c1 to c5 being connected to the network N and a user of at least another one have a speech communication. The user during a telephone call over a telephone is capable of activating another task during the telephone call to perform the task. Information obtained through the performance of the activated task can be received by the telephone on line for the telephone call or another communication terminal device corresponding to this telephone.

In order to realize the present embodiment, a service server apparatus is necessary for providing the service through different task from a telephone call while the telephone is on line for the telephone call. A service server apparatus for realizing the present embodiment performs tasks of translating the content of a telephone call, synthesizing speeches in accordance with the content of the telephone call after the translation, generating data (hereinafter, also referred to as task data) obtained by inserting synthesized speeches in the telephone call speeches, generating a text of the telephone call content after the translation, and transmitting task data and data converted into a text (hereinafter, also referred to as text data) to a telephone, etc., on line for a telephone call in conjunction with another operation.

The service server apparatus for realizing the present embodiment will be explained in more detail.

(Service Server Apparatus)

(i) Function

Figure 2:
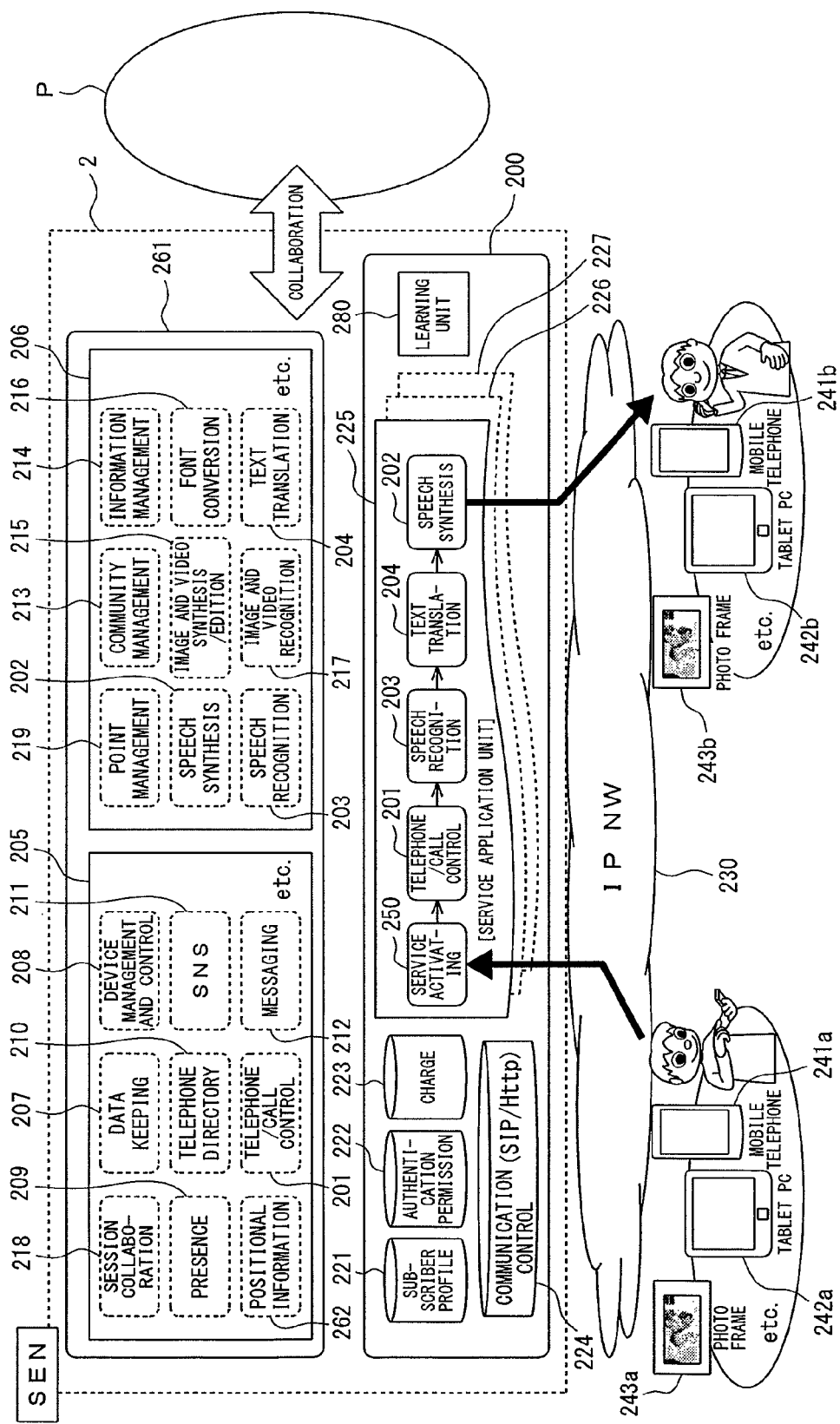
FIG. 2 is a block diagram of a service server apparatus according to an embodiment of the present invention.

FIG. 2 is a block diagram illustrating a configuration example of a service server apparatus according to the present embodiment. A service server apparatus 200 illustrated in FIG. 2 is configured to communicate with an enabler group 261 including a plurality of enablers. It is to be noted that a term "enabler" means driver software for activating a computer, and indicates software (application) designed for each of intended purposes.

The enabler group 261 includes an enabler group 205 for a telephone function and an enabler group 206 added to realize a translation function that is a specific function according to the present embodiment. The enabler group 205 includes, for example, a session collaborating enabler 218, a data keeping enabler 207, a device management controlling enabler 208, a presence enabler 209, a telephone directory enabler 210, an SNS (Social Networking Service) enabler 211, a positional information detecting enabler 262, a telephone/call control enabler 201, and a messaging enabler 212.

The enabler group 206 includes, for example, a point managing enabler 219, a community managing enabler 213, an information managing enabler 214 for managing predetermined information in accordance with an application, a speech synthesizing enabler 202, an image and video synthesizing/editing enabler 215, a font converting enabler 216, a speech recognizing enabler 203, an image and video recognizing enabler 217, and a text translating enabler 204.

The enabler group 205 for the telephone function is a set of enablers relating to a speech communication. Moreover, the enabler group 206 is a set of enablers different from the application relating to the speech communication. That is, herein, the enablers included in the enabler group 205 are tasks performed by the application relating to a speech communication, while the enablers included in the enabler group 206 are other tasks that are operations performed by a different application from the task performed by the application relating to the speech communication.

The enabler groups 205 and 206 included in the enabler group 261 constitute an environment for providing a service at the network side, i.e., a so-called service enabler network (hereinafter, referred to as an SEN) 2. The SEN 2 is capable of providing various services in collaboration with a plurality of Internet players P capable of providing a plurality of services including a translation service.

According to the present embodiment, in order to perform a task relating to translation, the service server apparatus 200 obtains the telephone/call control enabler 201 in the enabler group 205 and store the obtained enabler in a service application unit. Moreover, the service server apparatus 200 obtains the speech translating enabler 204, the speech recognizing enabler 203, and the text translating enabler 202 from the enabler group 206, and stores those enablers in the service application unit. As explained above, according to the present embodiment, all service application units include a service activating unit 250. As a result, according to the present embodiment, the service application unit serves as a service application unit 225 for providing a service relating to a translation.

The service server apparatus 200 is capable of obtaining a necessary enabler for performing a task in accordance with the type of the service. The enabler obtained by the service server apparatus 200 is stored in the service server apparatus 200 as a service application (service application software) unit for each service, as will be described later.

According to such a configuration, the service server apparatus 200 according to the present embodiment is capable of achieving a necessary application for the service by combining existing enablers. Hence, according to the present embodiment, it is unnecessary to develop a new exclusive application, and a time and a cost for developing an application can be eliminated. Moreover, according to the present embodiment, since the service can be provided using existing applications having practical accomplishments, it becomes possible to provide a service with higher reliability than that of a case where an application is newly developed.

According to the present embodiment, it is assumed that a call-originating communication terminal device 241*a* and a call-receiving communication terminal device 241*b* communicate with each other and receive the service from the service server apparatus 200. For providing the service to the call-originating communication terminal device 241*a* and the call-receiving communication terminal device 241*b*, the service server apparatus 200 performs a task. The call-originating communication terminal device 241*a* and the call-receiving communication terminal device 241*b* in the present embodiment are each, for example, a mobile telephone having both of a function as a telephone and a function of transmitting/receiving texts, still images and motion images, etc.

The service server apparatus 200 includes existing configurations that control a telephone call as a telephone, in addition to the service application unit having an enabler in accordance with the service. The configurations for controlling a telephone call include a subscriber profile storing unit 221 that stores data on a subscriber of the CC service (i.e., a user who receives the CC service, hereinafter, simply referred to as a "user"), an authentication permitting unit 222 that authenticates and permits the request for providing the CC service, a charge process unit 223 that performs a process relating to a charge for a telephone communication, and a communication control unit 224 that controls telephone communication and packet communication. The communication control unit 224 also has a function serving as a providing unit for providing task data to the call-originating communication terminal device 241*a* and the call-receiving communication terminal device 241*b*.

The subscriber profile storing unit 221 registers therein beforehand the kind of the language of the user in association with the name of the user and the telephone number of the telephone used by the user. In addition, the subscriber profile storing unit 221 also registers therein an MSISDN (Mobile Subscriber ISDN Number: a telephone number registered in the SIM card of a telephone) included in a data communication session between the telephones that is information for identifying a telephone. In order to let the above-explained device, such as a tablet PC or a photo frame, to be associated with the telephone, it is appropriate if the identifiers of those devices be registered in the subscriber profile storing unit 221 in association with the telephone number of the corresponding telephone.

The service server apparatus 200 may include a plurality of service application units 225, 226, and 227. According to a first embodiment, the plurality of service application units 225, 226, and 227 may be utilized as a memory area capable of storing, for example, a plurality of enablers. When such a configuration is employed, the memory area can be configured to be any one of the service application units 225, 226, and 227 in accordance with the enabler to be stored. The memory area to be the service application unit according to the present embodiment stores the service activating unit 250. The service activating unit 250 has a function of activating the enabler to provide the service by receiving an instruction transmitted from, for example, the call-originating communication terminal device 241*a* through an IP network 230.

According to the present embodiment, when the user operates the call-originating communication terminal device 241*a*, the service activating unit 250 activates the enabler stored in the service application unit 225. When the enabler stored in the service application unit 225 is activated, a task is initiated. The activated telephone/call control enabler 201 records the verbal speeches (hereinafter, referred to as a call speech) of a speaker during the communication between the call-originating communication terminal device 241*a* and the call-receiving communication terminal device 241*b*. Regarding the recording of the call speech, the recording by a well-known answering machine function of the telephone/call control enabler 201 is controlled and the recording may be carried out through the call speech recording function of the answering machine function.

The speech recognizing enabler 203 generates text data from the recorded speeches. The speech recognizing enabler 203 analyzes the recorded speeches through, for example, morphological analyze, and converts the verbal speeches into text data.

The text translating enabler 204 translates the text data generated by the speech recognizing enabler 203 into the language of the user of the call-receiving communication terminal device 241*b*, thereby generating translated text data.

The speech synthesizing enabler 202 converts the translated text data generated by the text translating enabler 204 into speeches represented by sounds, thereby generating speech data to be read out by synthesized sounds.

According to the present embodiment, the speech data generated by the speech synthesizing enabler 202 is provided to the call-originating communication terminal device 241*a* and the call-receiving communication terminal device 241*b* together with a call speech. Moreover, according to the present embodiment, the text data generated by the speech recognizing enabler 203 and the translated text data generated by the text translating enabler 204 are also provided to the call-originating communication terminal device 241*a* and the call-receiving communication terminal device 241*b*. According to the present embodiment, a combination of the speech data, the text data, and the translated text data is also referred to as task data.

As explained above, the speech recognizing enabler 203, the text translating enabler 204, and the speech synthesizing enabler 202 perform a task based on the verbal speeches recorded by the telephone/call control enabler 201 when the service activating unit 250 receives an instruction for performing the task, and task data is generated through the performance of the task. The task data is provided to the call-originating communication terminal device 241a and the call-receiving communication terminal device 241b.

In the service server apparatus according to the present embodiment that employs the above-explained configuration, the service activating unit 250 functions as an instruction receiving unit. Moreover, the telephone/call control enabler 201 functions as a recording unit, and the speech recognizing enabler 203, the text translating enabler 204, and the speech synthesizing enabler 202 function as a task performing unit and a task data generating unit.

According to the present embodiment, the service activating unit 250 does not immediately activate each enabler when the call-originating communication terminal device 241a and the call-receiving communication terminal device 241b instruct the provision of the service, but instead may obtain subscriber information registered beforehand in the subscriber profile storing unit 221. Next, when the subscriber information includes information that identifies at least one of the call-originating communication terminal device 241a and the call-receiving communication terminal device 241b, the service activating unit may receive the instruction from the call-originating communication terminal device 241a or the call-receiving communication terminal device 241b.

According to the present embodiment, when the provision of the service is instructed, the activating condition of the service activating unit 250 may be set in such a way that a mobile telephone makes a telephone call while adding information like a specific number set beforehand to the telephone number of the local mobile telephone. When the activating condition is set in this manner, the service activating unit 250 receives the instructions from the call-originating communication terminal device 241a and the call-receiving communication terminal device 241b when at least one of the call-originating communication terminal device 241a and the call-receiving communication terminal device 241b makes a telephone call using the telephone number to which the information is added beforehand.

This embodiment is not limited to a case where the service activating unit 250 activates each enabler in accordance with signals output by the operation on the call-originating communication terminal device 241a and the call-receiving communication terminal device 241b. For example, when the call speech recorded by the telephone/call control enabler 201 is input, the service activating unit 250 may activate each enabler to start performing the task. When the service activating unit 250 is configured in this manner, terms that can identify an application like "honyaku kaishi (Japanese) start translation" are set beforehand. Next, when the call speech recorded by the speech recognizing enabler 203 is subjected to morphological analyze and only when the term set beforehand is included in the call speech, the service activating unit 250 activates each enabler to perform a task.

According to the present embodiment explained above, the call-originating communication terminal device 241a and the call-receiving communication terminal device 241b are not limited to mobile telephones that can transmit texts. When the call-originating communication terminal device 241a and the call-receiving communication terminal device 241b are telephones having only the telephone call function, the performance result of the task may be transmitted to tablet PCs 242a and 242b and photo frames 243a and 243b associated beforehand with the telephone in accordance with a request from the telephone having only the telephone call function.

(ii) Process Procedure

Figure 3:
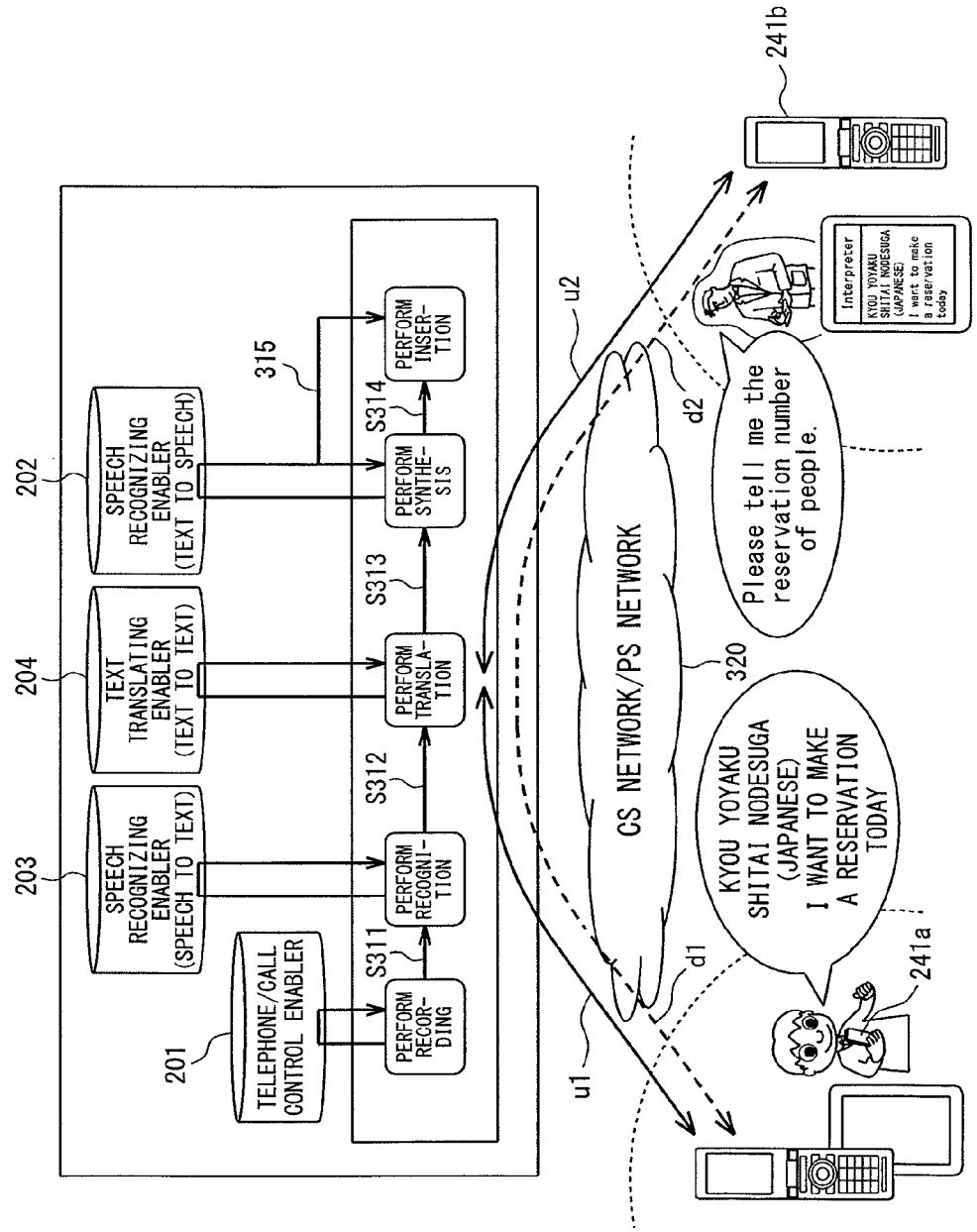
FIG. 3 is a diagram for explaining a procedure of a process performed by the service server apparatus illustrated in FIG. 2.

FIG. 3 is a diagram for explaining the procedure of the process performed by the service server apparatus illustrated in FIG. 2.

The service application unit 225 illustrated in FIG. 2 performs recording of a call speech through the telephone/call control enabler 201 illustrated in FIG. 2 (step S311). The recording of the call speech is performed with a call speech uttered from a condition on which no speech is recorded (hereinafter, also referred to as a silent recording condition) to a next silent recording condition being as a unit of recording. Next, the speech recognizing enabler 203 performs a morphology analysis to analyze verbal speeches. The analysis is performed for each call speech recorded as a unit. Subsequently, the call speech is converted into text data in accordance with the analysis result (step S312).

Next, the service application unit 225 causes the text translating enabler 204 to translate the text data converted in the step S312 into the translated text data of the language registered beforehand in the subscriber profile storing unit 221 by the user of the call-receiving communication terminal device 241b (step S313). The translated text data that have been translated is converted into synthesized speeches, and becomes speech data (step S314). Moreover, the speech data is inserted in the call speech (step S315).

The terms "insert speech data into a call speech" means to determine a timing of transmitting the speech data in synchronization with the call speech. By determining the transmission timing of the speech data in this manner, the call speech is normally transmitted to the call-originating communication terminal device 241a and the call-receiving communication terminal device 241b through a CS (Circuit Switched) network. Moreover, the speech data is transmitted to the call-originating communication terminal device 241a and the call-receiving communication terminal device 241b through data communication sessions via the CS network, but can be transmitted through a PS (Packet Switched) network. Furthermore, the text data converted into texts by translating the call speech is transmitted through the PS network. In FIG. 3, the CS network and the PS network are indicated by a reference numeral 320.

However, the present embodiment is not limited to the case where the call speech is transmitted through the CS network. For example, the call speech may be transmitted to the call-originating communication terminal device 241a and the call-receiving communication terminal device 241b through the PS network together with the speech data.

According to the present embodiment, as explained above, the call speech uttered from a silent recording condition to the next silent recording condition is recorded, recognized and translated as a unit to generate task data, and every time the task data is generated, the task data is transmitted to the call-originating communication terminal device 241a and the call-receiving communication terminal device 241b. Accordingly, the call speech and the task data are transmitted to the call-originating communication terminal device 241a and the call-receiving communication terminal device 241b in a synchronized manner.

According to the present embodiment, in order to avoid a strange feel of a telephone call, the call speech is normally transmitted from the call-originating communication terminal device 241a to the call-receiving communication terminal device 241b in real time that is a called side. Hence, when the speech data is inserted into the call speech, the user may listen to the speech by the speech data in a manner overlapping the call speech. When, however, the users have a conversation through an interpreter, in general, a person tends to avoid uttering from his/her side while the interpreter is uttering. Hence, it is not likely to occur that verbal speeches by the speech data overlap the call speech and such an overlap makes the conversation difficult.

According to the present embodiment, both call-originating communication terminal device 241a and call-receiving communication terminal device 241b access the service application unit 225 to obtain text data, translated text data, and speech data. The method of connecting the call-originating communication terminal device 241a and the call-receiving communication terminal device 241b through the service application unit 225 is called bridge connection.

Moreover, the service server apparatus 200 illustrated in FIG. 1 can identify the telephone line of the call-originating communication terminal device 241a and that of the call-receiving communication terminal device 241b through a well-known method. Hence, the service server apparatus can identify an up link u1 of the call-originating communication terminal device 241a and a down link d1 thereof, an up link u2 of the call-receiving communication terminal device 241b and a down link d2 thereof. Thus, the service server apparatus can appropriately translate the uttered speech of the user and transmit the translation to the called side.

According to the present embodiment explained above, a call speech, speech data of synthesized speeches, text data, and translated text data can be provided to the call-originating communication terminal device 241a and the call-receiving communication terminal device 241b. Hence, the user is able to easily recognize how the service server apparatus 200 has recognized the content of the uttered speech made by the user himself/herself, and is able to quickly correspond to a mistranslation, etc., like correction of such a mistranslation. Moreover, the user is able to listen to both call speeches from the called side and the speech data obtained by translating the call speeches, and thus a conversation with a realistic feel as if the conversation were being made through an interpreter therebetween is realized.

(iii) CS Network and PS Network

Figure 4:
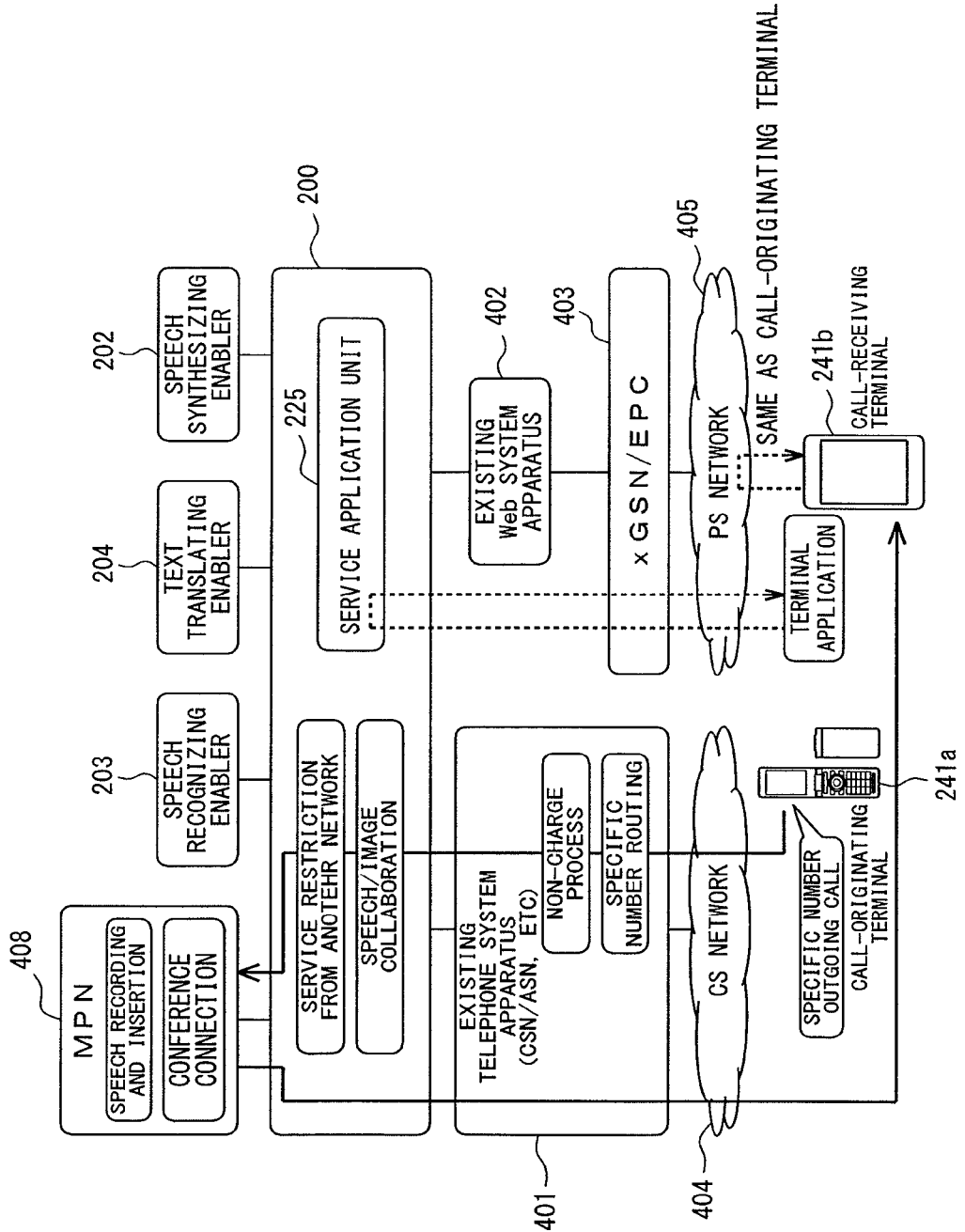
FIG. 4 is a diagram for specifically explaining a CS network and a PS network for connecting the service server apparatus illustrated in FIG. 2 and FIG. 3 with a call-originating communication terminal device and a call-receiving communication terminal device.

FIG. 4 is a diagram for specifically explaining a CS network 404 and a PS network 405 for connecting the service server apparatus 200 illustrated in FIG. 2 and FIG. 3 with the call-originating communication terminal device 241a and the call-receiving communication terminal device 241b.

The call-originating communication terminal device 241a makes a telephone call to an MPN (Media Processing Node) 408. This outgoing call signal reaches the CS network 404 and an existing telephone system apparatus 401. The existing telephone system apparatus 401 indicates, for example, a CSN (e.g., an authentication apparatus, a home agent for realizing a hand-over, and a DHCP server), and an ASN (e.g., a wireless base station). The existing telephone system apparatus 401 performs a non-charge process and a specific-number routing process on the outgoing call. The non-charge process is a process of not performing a charge process that is necessary for a telephone call in general. Moreover, the specific-number routing is to change the communication route to a communication route where a process different from the original process is performed when a telephone call is made to a telephone number (a specific number) set beforehand.

Next, the call signal reaches the service server apparatus 200 according to the present embodiment from the existing telephone system apparatus 401. Since the service server apparatus 200 includes the communication control unit 224 for controlling a communication illustrated in FIG. 1 between telephones, the subscriber profile storing unit 221, the authentication permitting unit 222, and the charge process unit 223, such configurations perform processes of restricting a service from another network and associating verbal speeches with screens (association of speech data with text data, etc.).

The association of the speech data with the text data and the translated text data is realized as follows.

That is, when a telephone that can receive the service is on line, the communication control unit 224 of the service server 200 starts monitoring the performance of a data communication session including an MSISDN that matches the MSISDN included in the signals relating to the telephone call from the telephone. Next, when a data session that matches the MSISDN included in the signals relating to the telephone call is carried out, it is determined that this telephone call should be associated with the data session in the CC service. According to this method, when call speeches, speech data, text data and translated text data are transmitted to one communication terminal device, the call speeches transmitted through the CS network 404 can be associated with task data transmitted through the PS network 405.

Figure 5:
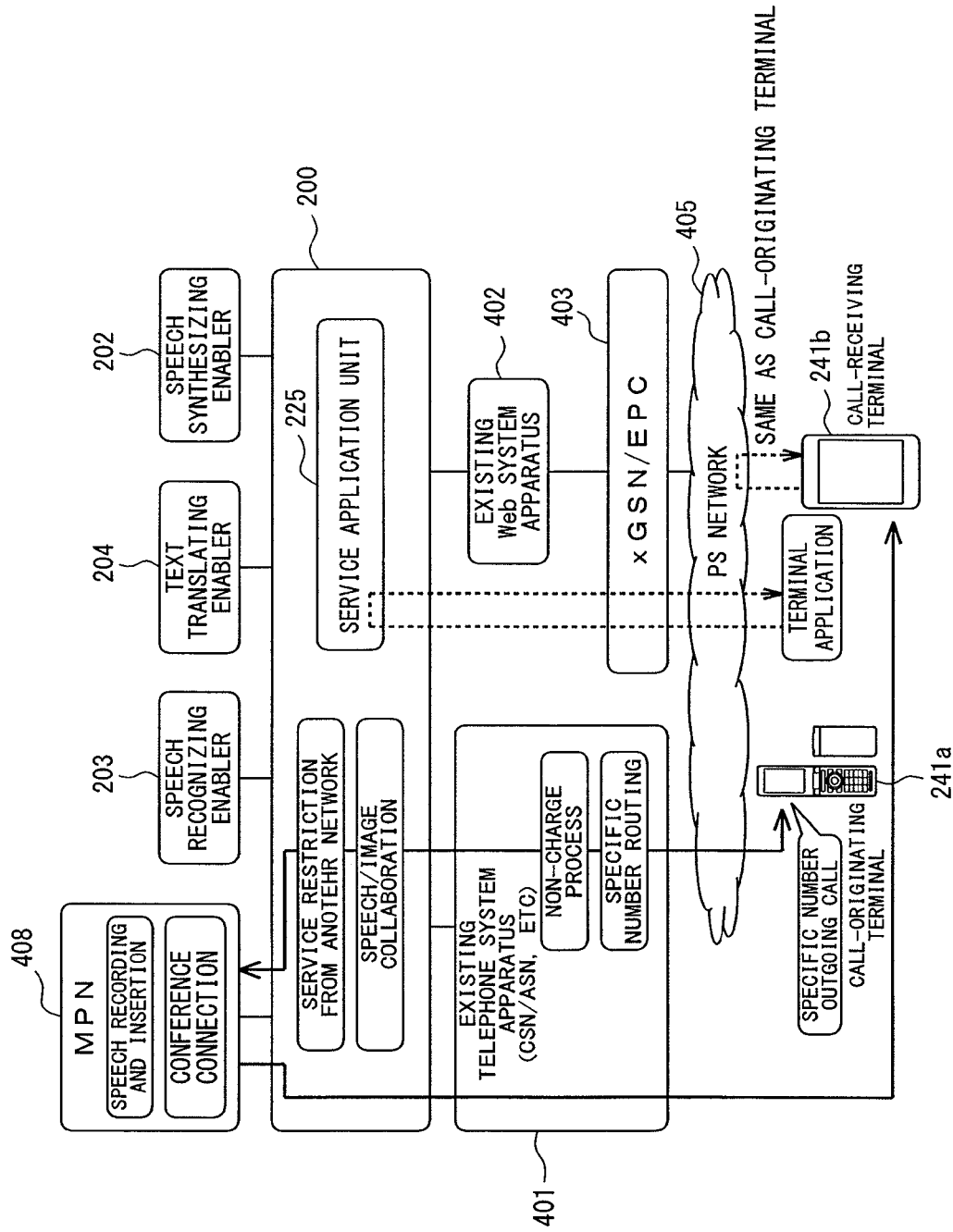
FIG. 5 is a diagram for specifically explaining a PS network for connecting the service server apparatus illustrated in FIG. 2 and FIG. 3 with the call-originating communication terminal device and the call-receiving communication terminal device.
Figure 8A:
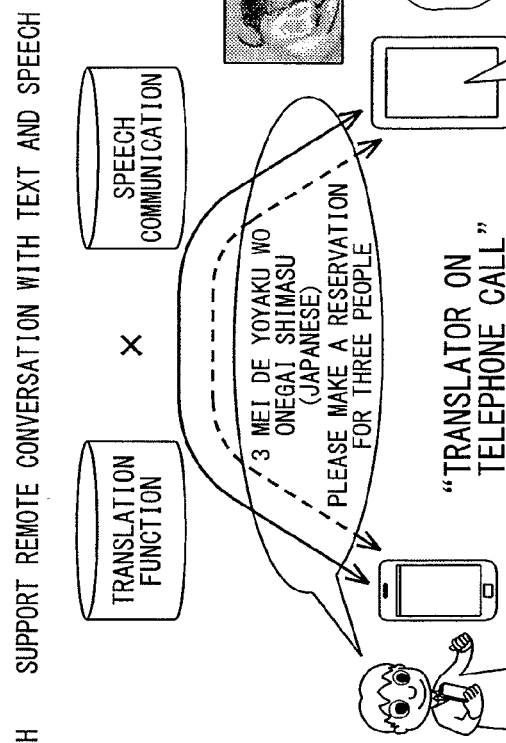
FIG. 8A is a diagram for explaining a structure of a typical translator.
Figure 8B:
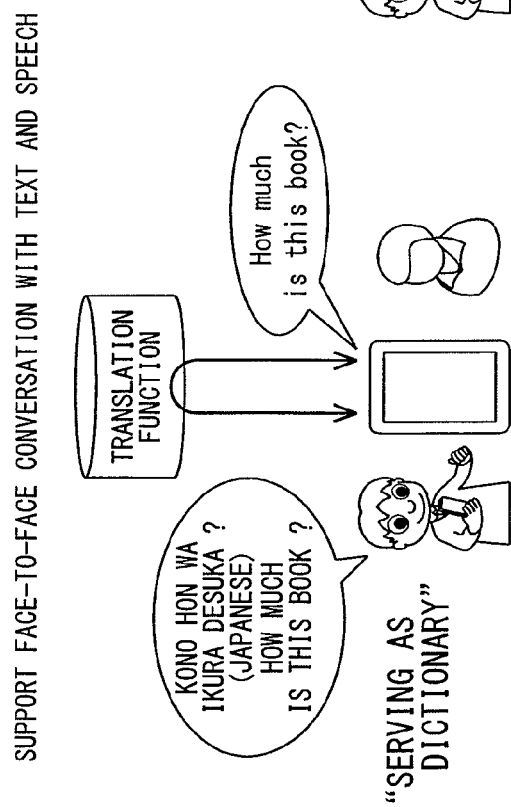
FIG. 8B is a diagram for explaining a structure of a typical translation system.

As explained above, according to the present embodiment, the call speeches can be transmitted through the PS network 405 like the speech data. FIG. 5 illustrates a configuration of transmitting the call speeches through the PS network 405 together with the speech data, etc.

According to the first embodiment, in the subscriber profile storing unit 221 illustrated in FIG. 2, as explained above, the telephone having only the call function is registered in association with the communication terminal device that is capable of transmitting texts, etc. In this case, when a telephone call is made with the telephone number of the telephone, the communication control unit 224 may transmit a URL where task data can be obtained to the address of the registered communication terminal device.

Call speeches corresponding to the outgoing call are recorded by the telephone/call control enabler 201 in the MPN 408, and transmitted to the service server apparatus 200.

In the service server apparatus 200, the application unit 225 generates speech data, text data and translated text data based on the call speeches recorded by the application unit 225. The speech data is transmitted to the call-receiving communication terminal device 241b through the CS network. Transmission of the speech data can be carried out through the PS network. Moreover, the text data and the translated text data are transmitted to the call-receiving communication terminal device 241b through the PS network 405 via an existing Web system apparatus 402 (e.g., a gateway), and xGSN (x-GPRS Support Node)/EPC (Evolved Packet Core).

(iv) Service Providing Method

FIG. 6 illustrates a diagram for explaining a service providing method realized by the service server apparatus 200 according to the present embodiment. In FIG. 6, a data communication through the HTTP (Hypertext Transfer Protocol) is indicated by a dashed line, while a telephone call through telephones is indicated by a continuous line.

In the call-originating communication terminal device 241a, for example, the user activates an application for realizing the service providing method according to the present embodiment, and inputs a telephone number of a called side (step S501). The address of the call-originating communication terminal device 241a is transmitted to the service server apparatus from the call-originating communication terminal device 241a through such a process. Next, the service server apparatus 200 receives an instruction of performing a task during the communication (the telephone call) upon satisfaction of other necessary requirements, and starts the translation service (step S502).

The service server apparatus 200 establishes a communication line between the call-originating communication terminal device 241a and the call-receiving communication terminal device 241b (step S503). Next, the service server apparatus 200 records the call speeches transmitted from the line of the call-originating communication terminal device 241a (step S504), and transmits the recorded speeches to the line of the call-receiving communication terminal device 241b (step S505).

When it becomes the silent recording condition on which no call speech is transmitted from the line of the call-originating communication terminal device 241a, the service server apparatus 200 once terminates the recording of the call speech transmitted from the line of the call-originating communication terminal device 241a (step S506). Next, the speech recognizing enabler 203, the text translating enabler 204, and the speech synthesizing enabler 202 all illustrated in FIG. 2 and FIG. 3 convert the recorded call speeches into texts, translate the recorded call speeches, and synthesize synthesized speeches (step S507), thereby generating speech data, text data, and translated text data.

Next, the service server apparatus 200 according to the present embodiment transmits the speech data to both of the call-originating communication terminal device 241a and the call-receiving communication terminal device 241b, and transmits the text data and the translated text data to both of the call-originating communication terminal device 241a and the call-receiving communication terminal device 241b (steps S508 to 511). Next, when the user of the call-receiving communication terminal device 241b starts uttering, the service server apparatus 200 performs the above-explained operations on the call speech of the user transmitted from the telephone line of the call-receiving communication terminal device 241b. When one user between the two users utters while the other user is uttering, according to the present embodiment, the above-explained processes are performed on the call speech of the user having the call speech being recorded, and the content of the talk uttered by the other user is not subjected to the processes.

The present embodiment is not limited to the above-explained configuration. That is, in the present embodiment explained above, the CC service relating to a translation is performed for a telephone call between the two users. However, the present embodiment is not limited to the service for the telephone call between the two users, and can be applied to a telephone conference, etc., having telephone calls made among equal to or greater than three users.

Moreover, the present invention is not limited to the configuration applied to the application relating to the translation according to the present embodiment. FIG. 7 is a diagram for explaining an example case where the service server apparatus, the service control method, and the service control program according to the present invention are applied to an application for adjusting the schedule of a user.

According to the example illustrated in FIG. 7, the service server apparatus provides a service by a scheduler task different from a speech communication while the call-originating communication terminal device 641a and the call-receiving communication terminal device 641b are in communication. According to such an example, the user of the call-originating communication terminal device 641a operates, for example, the call-originating communication terminal device 641a so as to perform the scheduler task during the telephone call, thereby giving an instruction to the service server apparatus. When the service server apparatus receives the instruction, the call speeches of the users of the call-originating communication terminal device 641a and the call-receiving communication terminal device 641b are recorded during the telephone call in communication.

In the example illustrated in FIG. 7, the service server apparatus obtains respective call speeches from the telephone lines of the call-originating communication terminal device 641a and the call-receiving communication terminal device 641b and records respective call speeches. A speech recognizing unit illustrated in FIG. 2 performs, for example, a morphological analysis on the recorded call speech, and detects that a speech meaning "schedule adjustment" is included in the call speech. Since "schedule adjustment" is included in the call speech, it is determined that an instruction has been made in such a manner as to perform a task of extracting an available day and hour, and its time slot in schedules of the users of the call-originating communication terminal device 641a and the call-receiving communication terminal device 641b.

Next, the information managing enabler 214, etc., illustrated in FIG. 2 functions as a schedule information managing unit, and obtains the schedule data of the users registered in the call-originating communication terminal device 641a and the call-receiving communication terminal device 641b. The information managing unit 214 extracts an available day and its time slot in schedules of the two users registered from the obtained schedule data. The extracted day and hour are transmitted to both call-originating communication terminal device 641a and call-receiving communication terminal device 641b as image data including text data.

According to such a configuration, it becomes possible to provide a communication which allows the adjustment of the schedule with ease and certainty. In addition, it becomes possible to give a realistic feel as if both users were seeing each other face to face, and adjust the schedule to the users of the call-originating communication terminal device 641a and the call-receiving communication terminal device 641b.

(v) Service Providing Program

In the above-explained service server apparatus, a service providing program for providing a service by a different task from the speech communication is performed during the communication between speech communication terminal devices that are capable of communicating with each other by verbal speeches. This service providing program is a program that allows a computer to realize an instruction receiving function of receiving an instruction for performing another task during a speech communication, a recording function of recording verbal speeches of a speaker during a speech communication between a plurality of the speech communication terminal devices, a task performing function of performing the task based on the verbal speeches recorded by the recording function when the instruction receiving function receives the instruction, a task data generating function of generating task data including text or the verbal speeches obtained by the task performing function that has performed the task, and a function of providing task data to a speech communication terminal device performing a speech communication or a text communication terminal device associated with the speech communication terminal device and capable of communicating with texts.

The scope and spirit of the present invention is not limited to the exemplary embodiment illustrated and explained above, and include all embodiments that can bring the equivalent advantages to those intended by the present invention. The scope and spirit of the present invention are not limited to the combinations of the features of the present invention set forth in appended claims, but are defined by any desirable combinations of particular features among all of the respective disclosed features.

INDUSTRIAL APPLICABILITY

The present invention can provide a service providing apparatus, a service providing method, and a service providing program which are suitable for supporting a communication through a smart phone, etc.

REFERENCE SIGNS LIST

200 Service server apparatus
201 Telephone/call control enabler
202 Speech synthesizing enabler
203 Speech recognizing enabler
204 Text translating enabler
205, 206, 261 Enabler group
208 Device management controlling enabler
209 Presence enabler
210 Telephone directly enabler
211 SNS enabler
212 Messaging enabler
213 Community managing enabler
214 Information managing enabler
215 Editing enabler
216 Font converting enabler
217 Image and video recognizing enabler
218 Session collaborating enabler
219 Point managing enabler
221 Subscriber profile storing unit
222 Authentication permitting unit
223 Charge process unit
224 Communication control unit
225, 226, 227 Service application unit
230 Network
241a, 641a Call-originating communication device
241b, 641b Call-receiving communication terminal device

The invention claimed is:

1. A server apparatus in communication with a plurality of terminal devices configured to facilitate speech communication between a first speaker and at least one second speaker via a translation task, the server apparatus comprising:
    an instruction receiving unit configured to receive an instruction for performing the translation task;
    a recording unit configured to record verbal speech in a first language of the first speaker during the speech communication;
    a speech recognizing unit configured to generate text data in the first language based on the verbal speech recorded by the recording unit in accordance with the instruction for performing the translation task;
    a text translating unit configured to translate the text data in the first language generated by the speech recognizing unit into a second language of the second speaker and generate translated text data in the second language, wherein the second language is different from the first language;
    a speech synthesizing unit configured to convert the translated text data in the second language generated by the text translating unit into translated speech data in the second language, the translated speech data voiceable by the terminal devices as synthesized sounds; and
    a providing unit configured to provide the text data in the first language, the translated text data in the second language, and the speech data in the second language to each of the terminal devices.

2. The server apparatus according to claim 1, wherein the instruction receiving unit obtains subscriber information, and receives the instruction when the subscriber information includes information specifying one or more of the terminal devices.

3. The service server apparatus according to claim 1, wherein:
    the terminal devices include a telephone, and
    the instruction receiving unit receives the instruction when at least one of the terminal devices associated with the first speaker executes a telephone call to a telephone number associated with the terminal device of the at least one second speaker.

4. The server apparatus according to claim 1, wherein the instruction receiving unit is configured to start performing the translation task, when the verbal speech recorded by the recording unit is a verbal speech indicating a predetermined meaning.

5. The server apparatus according to claim 1, wherein the instruction receiving unit is configured to start performing the translation task, when a signal output by operating at least one of the plurality of speech communication terminal devices is a predetermined signal.

6. A computer-implemented method for facilitating speech communication amongst respective users of a first terminal device and a second terminal device communicatively coupled to a server configured to execute the method, the method comprising:
    receiving an instruction for performing a translation task during the speech communication;
    recording verbal speech of a first user received from the first terminal device during the speech communication, wherein the recorded verbal speech is in a first language;
    generating text data in the first language based on the recorded verbal speech in accordance with the instruction;
    generating translated text data in a second language based on the text data in the first language, wherein the second language is different from the first language and is associated with a second user;
    converting the translated text data in the second language into translated speech data in the second language, wherein the translated speech data is voiceable by the terminal devices as synthesized sounds; and
    providing the text data in the first language, the translated text data in the second language, and the translated speech data in the second language to each of the first and second terminal devices.

7. A non-transitory computer readable medium storing a set of instructions that, when executed by a processor of a server apparatus communicatively coupled to a plurality of terminal devices for facilitating speech communication amongst respective users, causes the processor to:
    receive an instruction for performing a translation task during the speech communication;
    cause a recording unit to record verbal speech of a first user received from one of the plurality of terminal devices during the speech communication, wherein the recorded verbal speech is in a first language;
    cause a speech recognizing unit to receive the recorded verbal speech and to generate text data in the first language based on the recorded verbal speech in accordance with the received instruction;
    cause a text translating unit to receive the text data and to generate translated text data in the second language based on the text data in the first language, wherein the second language is different from the first language and is associated with a second user;

cause a speech synthesizing unit to receive the translated text data and to convert the translated text data into translated speech data in the second language, wherein the translated speech data is voiceable by the plurality of terminal devices as synthesized sounds; and cause a providing unit to receive and provide to each of the plurality of terminal devices: the text data in the first language, the translated text data in the second language and the translated speech data in the second language; such that the text data, the translated text data, and the translated speech data is broadcastable to respective users via each terminal device.

\* \* \* \* \*